United States Patent
Aoki et al.

(10) Patent No.: US 6,532,113 B2
(45) Date of Patent: Mar. 11, 2003

(54) DISPLAY DEVICE FOR USE IN VEHICLE

(75) Inventors: Kunimitsu Aoki, Shizuoka (JP);
Makoto Takashima, Shizuoka (JP);
Takanori Watanabe, Shizuoka (JP);
Kousuke Kinoshita, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/988,243

(22) Filed: Nov. 19, 2001

(65) Prior Publication Data

US 2002/0089756 A1 Jul. 11, 2002

(30) Foreign Application Priority Data

Jan. 10, 2001 (JP) .......................... 2001-002601

(51) Int. Cl.$^7$ .............................................. G02B 27/14
(52) U.S. Cl. ........................................ 359/630; 359/637
(58) Field of Search ................................. 359/630, 631, 359/632, 633, 636, 637, 638, 639, 815; 345/7, 8, 9

(56) References Cited

U.S. PATENT DOCUMENTS

| 4,740,780 A | * | 4/1988 | Brown et al. .................... 345/7 |
| 5,909,317 A | * | 6/1999 | Nakaoka et al. ............. 359/631 |
| 6,288,689 B1 | * | 9/2001 | Shikama ......................... 345/7 |

FOREIGN PATENT DOCUMENTS

| JP | 3-113413 | 5/1991 |
| JP | 4-283790 | 10/1992 |
| JP | 6-270716 | 9/1994 |
| JP | 11-64779 | 3/1999 |

* cited by examiner

Primary Examiner—Georgia Epps
Assistant Examiner—Saeed Seyrafi
(74) Attorney, Agent, or Firm—Armstrong, Westerman & Hattori, LLP

(57) ABSTRACT

A display device for use in a vehicle is provided, by which an image for superposition displayed on a display source is projected on a windshield of a vehicle so that the foreground of the vehicle and a virtual image of the image for superposition are accurately seen together even when a seat position and a physique of a driver change and when a shape of the windshield changes. A light of inverse image for superposition displayed on a display surface 5a of a display unit 5 in a dashboard 1 in a vehicle is projected on a windshield 3 so that the driver sees the foreground visible through the windshield 3 together with a virtual image of the inverse image for superposition reflected on the windshield 3 in front of an eye point I, that is, a virtual image of the original image for superposition. In order to cancel out distortion arisen when the light of the inverse image for superposition is reflected on the windshield 3, the inverse image for superposition displayed on the display unit 5 is distorted in advance in response to the contents stored in an external ROM provided in a control unit 7, which is replaceable with another ROM storing the different contents.

4 Claims, 6 Drawing Sheets

DISPLAY DEVICE FOR USE IN VEHICLE

BACKGROUND OF THE INVENTION (1) Field of the Invention

The present invention relates to a display device for use in a vehicle and, more specifically, to a display device for use in a vehicle, by which an image for superposition displayed on a display source is projected on a windshield of the vehicle so that a driver can see the foreground of the vehicle visible through the windshield together with a virtual image of the image for superposition, which is superposed upon the foreground.

(2) Description of the Related Art

Recently, with increase and diversification of information required by a driver during a drive, a projection-type display unit called a head up display has been adopted so that information, which cannot be displayed in a meter unit due to the lack of the space, is displayed on a windshield as a virtual image, thereby a driver can see the foreground of the vehicle through the windshield together with the virtual image, which is superposed upon the foreground.

In such a projection-type display unit, since a windshield on which an image from an image source is projected has not a plane surface, and the curvature and the angle of inclination relatively to the horizontal plane (or vertical plane) are different depending upon the position on the windshield, therefore the virtual image projected on the windshield is distorted, thereby affecting the visibility of the virtual image.

In order to solve the problem described above, the correction of distortion of the virtual image projected on a windshield has been proposed by using an optical element or by controlling the display as disclosed, for example, in Japanese Patent Application Laid-Open No. H3-113413 and No. H4-283790.

However, these proposals do not take the following situation into consideration: that is, a seat position and a physique of a driver change depending upon the driver, resulting in that a position on the windshield to be seen from the eye point cannot be determined at a specific position; and the contents or degree of distortion of a virtual image to be seen on the windshield changes depending upon a shape of the windshield, which may change depending upon the type of the vehicle. Therefore, a correction of the distortion is carried out uniformly, thereby being unable to respond to the situations described above.

SUMMARY OF THE INVENTION

It is therefore an objective of the present invention to solve the above problem and to provide a display device for use in a vehicle, by which an image for superposition displayed on a display source is projected on a non-plane windshield of the vehicle so that the foreground of the vehicle visible through the windshield and a virtual image of the image for superposition projected on the windshield, which is superposed upon the foreground, are seen together, and by which the distortion of a virtual image on the windshield can adequately be canceled: even when a seat position and a physique of a driver change depending upon the driver, resulting in that a position on the windshield to be seen from the eye point cannot be determined at a specific position; and when the contents or degree of distortion of a virtual image to be seen on the windshield changes depending upon a shape of the windshield, which may change depending upon the type of.the vehicle.

In order to attain the above objective, the present invention is to provide a display device for use in a vehicle, by which an image for superposition displayed on a display source is projected on a windshield of the vehicle so that the foreground of the vehicle visible from an eye point of the vehicle through the windshield and a virtual image of the image for superposition projected on the windshield, which is superposed upon the foreground, are seen together, comprising:

image distortion generating means for distorting the image for superposition in advance and displaying the distorted image for superposition on the display source so that distortion arisen in the virtual image of the image for superposition to be seen from the eye point due to non-flatness of the windshield is canceled out; and distortion pattern adjusting means for adjusting the amount of the distortion of the image for superposition displayed on the display source generated by the image distortion generating means with respect to upper and lower directions and right and left directions of the vehicle in the virtual image of the image for superposition, wherein the distortion pattern adjusting means adjusts a distortion pattern of the image for superposition displayed on the display source generated by the image distortion generating means to a distortion pattern in response to the non-flatness of the windshield and a positional relationship between the windshield and the eye point.

With the construction described above, the distortion of the virtual image of the image for superposition projected on the windshield can adequately be canceled out.

Preferably, the image distortion generating means displays a distorted lattice image for adjustment, in which a lattice image consisting of straight lines is distorted, on the display source as the image for superposition when the distortion pattern adjusting means adjusts a distortion pattern of the image for superposition displayed on the display source generated by the image distortion generating means.

With the construction described above, the distortion pattern generated by the image distortion generating means can easily be adjusted to a pattern, which precisely cancels out the distortion arisen in the virtual image of the image for superposition seen from the eye point due to the non-flatness of the windshield.

Preferably, the image distortion generating means comprises:

holding means for holding a coordinate conversion table indicating a correspondence between each pixel of an image signal of the image for superposition and each pixel of an image signal of the distorted image for superposition, in which the image for superposition being distorted in advance and displayed on the display source; and signal generating means for generating an image signal of the distorted image for superposition, by assigning data for each pixel of an image signal of the image for superposition as data for corresponding each pixel in the image signal of the distorted image for superposition, on the basis of the coordinate conversion table, wherein the distortion pattern adjusting means adjusts a distortion pattern of the image for superposition displayed on the display source generated by the image distortion generating means at least in response to a change in contents of the coordinate conversion table.

With the construction described above, the distortion of the virtual image of the image for superposition projected on the windshield can adequately be canceled out.

Preferably, the holding means consists of a replaceable storage medium, which constitutes the distortion pattern adjusting means.

With the construction described above, the distortion of the virtual image of the image for superposition projected on the windshield can adequately be canceled out only by replacing a storage medium, which constitutes the holding means.

DESCRIPTION OF THE PREFERRED EMBODIMENTS

In the following, a display device for use in a vehicle according to the preferred embodiments of the present invention will be explained with reference to the attached drawings.

Figure 1:
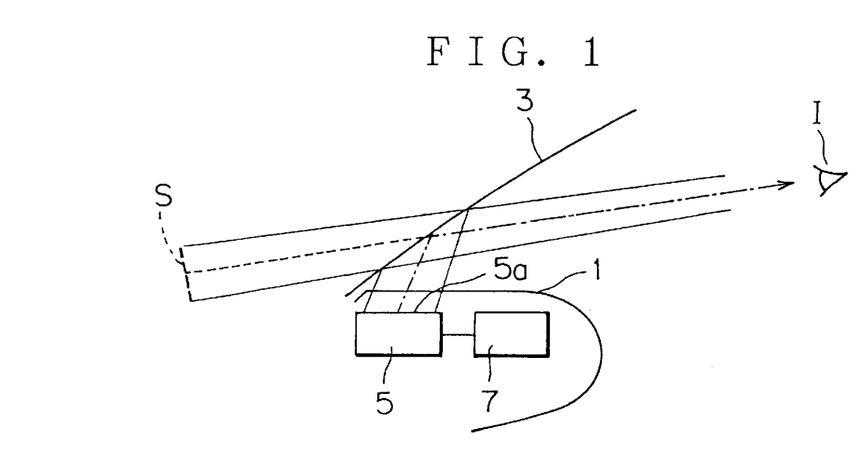
FIG. 1 is a cross sectional view illustrating a principle constitution of a display device for use in a vehicle according to a first preferred embodiment of the present invention.

FIG. 1 is a cross sectional view illustrating a principle constitution of a display device for use in a vehicle according to the first preferred embodiment of the present invention. The display device has a display unit 5 received in a dashboard 1 and a control unit 7 for controlling the contents of the image displayed on the display unit 5.

The display unit 5 is, for example, a natural light device (such as a field emission display, fluorescent display tube and electroluminescence display) and liquid crystal display with backlight. The display unit 5 luminously displays an inverse image for superposition (not shown in the figure) of supplementary information required for driving such as information for the direction of travel by navigation system and traveling speed on a display surface 5a arranged facing up, with arranging the upper side of the image for superposition to the rear side of the vehicle and the lower side of the image for superposition to the front side of the vehicle.

Figure 2:
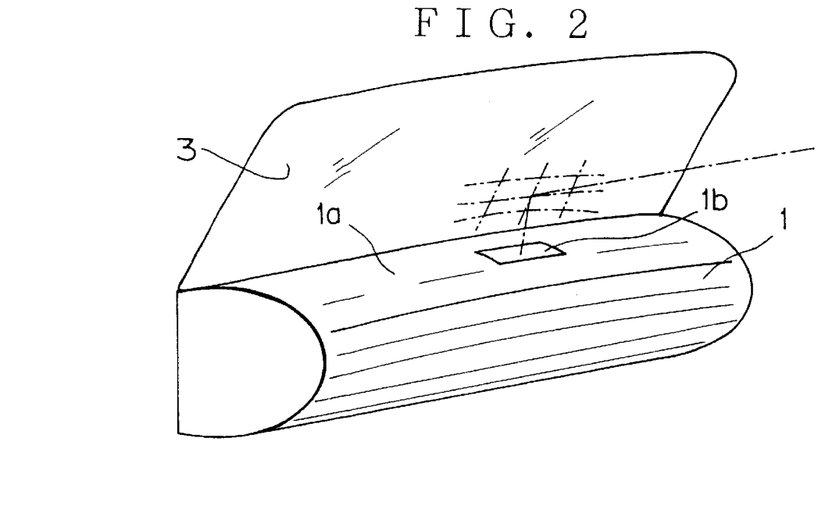
FIG. 2 is a view illustrating a windshield on which a light of an image from the display unit in FIG. 1 is irradiated and the circumference of the windshield.

As shown in FIG. 2, a light of the inverse image for superposition displayed on the display unit 5 is projected on a non-flat windshield 3 arranged above. the dash-board 1 passing through an opening 1b formed on an upper surface 1a of the dash-board 1, thereby the foreground seen through the windshield 3 and a virtual image S of the inverse image for superposition displayed on the display unit 5 are together seen from the eye point I of a driver of the vehicle.

Figure 3:
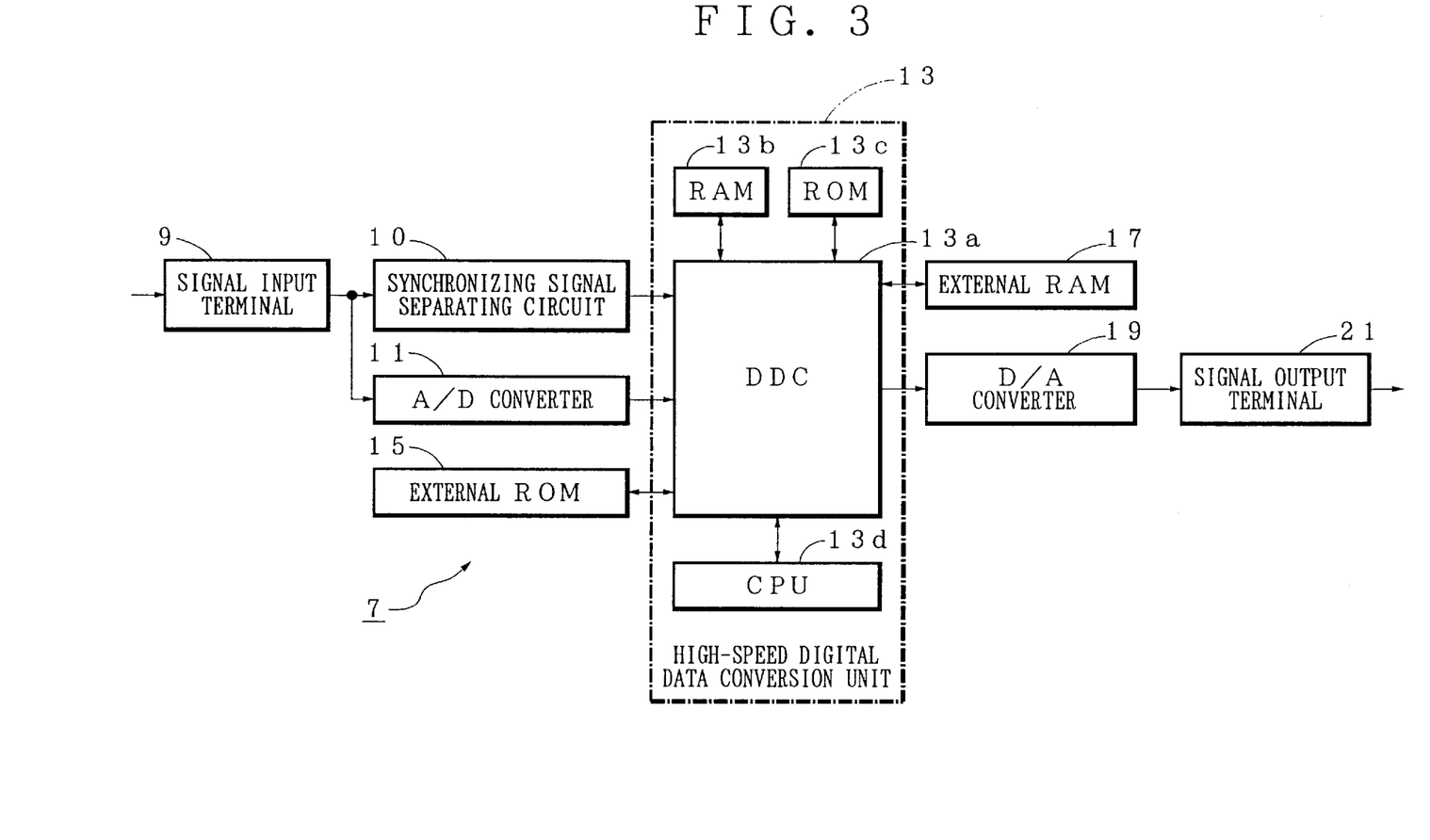
FIG. 3 is a block diagram illustrating an electrical constitution of the control unit in FIG. 1.

As shown in FIG. 3, the control unit 7 comprises:

signal input terminal 9 into which a signal of an image to be seen of an instrument information (that is, an information indicated by an instrument) required by a driver such as travelling speed, number of revolutions of an engine, residual amount of fuel and water temperature in radiator is input, these pieces of information being generated in an instrument information generating unit (not shown in the figure) on the basis of the detected results by means of various sensors (not shown in the figure) in the vehicle;

synchronizing signal separating circuit 10 for separating a synchronizing signal from the image signals input to the signal input terminal 9;

an analog/digital (AID) converter 11 for A/D-converting each pixel value of the image signal input to the signal input terminal 9 in turn starting from the value having small coordinate value; and a high-speed digital data conversion unit (hereinafter, conversion unit) 13 for processing a digital image signal, into which each pixel value is A/D-converted in the A/D converter 11.

The control unit 7 further comprises:

an external (i.e., outboard) ROM 15 (corresponding to the holding means) installing a coordinate conversion table required for processing the digital image signal by the conversion unit 13;

an external (i.e., outboard) RAM 17 as a video frame memory for tentatively storing each pixel value of the digital image signal, which is processed by the conversion unit 13;

a D/A converter 19 for D/A-converting each pixel value of the processed digital image signal, which is read out from the external RAM 17 by the conversion unit 13, in turn starting from the value having small coordinate value; and a signal output terminal 21 for outputting the processed analog image signal, into which each pixel value is D/A-converted by the D/A converter 19, to the display unit 5 as the image signal of the inverse image for superposition.

In the external ROM 15, installed is the coordinate conversion table, in which the coordinate value of each pixel of the image signal of the image to be seen input to the signal input terminal 9 is related with the corresponding coordinate value in the image signal of the inverse image for superposition output from the signal output terminal 21.

When the driver sees the windshield 3 from the eye point I as a standard position, the coordinate conversion table distorts in advance the inverse image for superposition displayed on the display unit 5 with a distortion pattern, which responds to: a positional relationship between the position of the eye point I and the windshield 3; curvatures of the windshield 3 in the horizontal and vertical directions thereof; and an angle of inclination of the windshield 3 relatively to the horizontal plane (or vertical plane), so that the virtual image of the image for superposition to be seen on the windshield 3 can be seen as a virtual image without distortion.

For example, supposing that the image to be seen indicated by the image signal input to the signal input terminal 9 is a lattice in which plurality of longitudinal and lateral straight lines intersect with each other, in the external ROM 15, coordinate values of the pixel corresponding to the four corners of the lattice and intersecting points of each longitudinal or lateral straight line in the following case (A) and case (B) are stored having a relationship therebetween: in case (A), the lattice, as it is, is displayed on the display unit 5; and in case (B), a lattice, which is distorted in the opposite direction to the direction in which the lattice is distorted by being projected on the windshield 3, is displayed on the display surface Sa of the display unit 5 so that the image of the lattice to be seen on the windshield 3 from the eye point is not distorted.

The conversion unit 13 comprises:
- a digital data controller (hereinafter, DDC) 13*a* for high-speed coordinate conversion processing constituted by an application specific integrated circuit (ASIC);
- a RAM 13*b* for providing a work area required for high-speed coordinate conversion processing by the DDC 13*a*;
- a ROM 13*c* in which a processing program carried out to make the DDC 13*a* carry out the high-speed coordinate conversion processing is installed; and
- a CPU 13*d* for carrying out an access control of the DDC 13*a* with respect to the synchronizing signal separating circuit 10 to be connected to the DDC 13*a*, the A/D converter 11, the external ROM 15, the external RAM 17 and the D/A converter 19.

Figure 4:
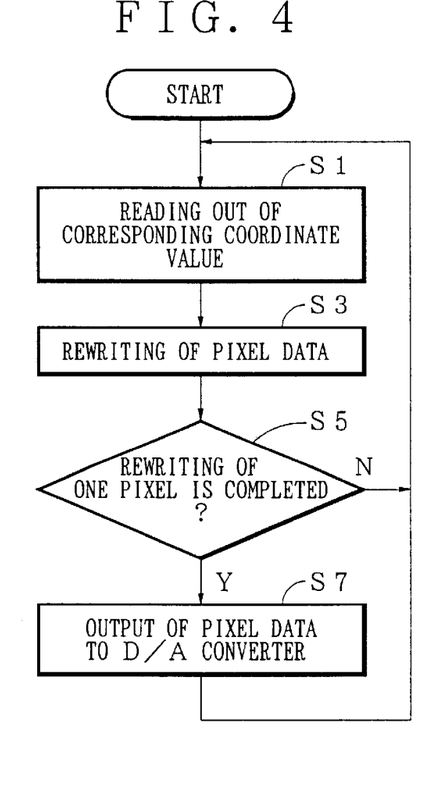
FIG. 4 is a flow chart illustrating a processing that the digital data controller in the high-speed digital data conversion unit in FIG. 3 makes the CPU carry out in accordance with a processing program stored in the ROM.

FIG. 4 is a flow chart of the processing, which is carried out by the DDC 13*a* according to a processing program installed in the ROM 13*c*.

By utilizing a synchronizing signal of the image signal of the image to be seen input to the signal input terminal 9, which is input from the synchronizing signal separating circuit 10, as a sampling clock, a corresponding coordinate value in the image signal of the inverse image for superposition, which is related with a coordinate value of each pixel in the image signal of the image to be seen, on the coordinate conversion table installed in the external ROM 15 is read out one by one in turn starting from one related with a small coordinate value in the image signal of the image to be seen (step S1).

Then, data at a video frame position of the coordinate value in the image signal of the inverse image for superposition, which is read out from the external ROM 15 at step S1, out of the external RAM 17 is rewritten to data of the pixel of the digital image signal taken in from the A/D converter 11 at that time (step S3). Then, with respect to pixel data of one image plane of the digital image signal taken in from the A/D converter 1, whether or not a rewriting of the video frame data in the external RAM 17 is completed is confirmed (step S5).

If not completed (N at step S5), the processing returns to step S1, on the other hand, if completed (Y at step S5), data of a pixel stored in the video frame of the external RAM 17 is read out for the amount of one image plane in turn starting from corresponding one having small coordinate value in the image signal of the inverse image for superposition and is output to the D/A converter 19 (step S7), and subsequently the processing returns to step S1.

In the first preferred embodiment, a series of the processing carried out by the conversion unit 13 according to the flow chart in FIG. 4 corresponds to the processing carried out by the signal generating means described in the claim. The conversion unit 13 and the external ROM 15 constitute the image distortion generating means described in the claim.

In the following, an operation of the display device for use in a vehicle according to the first preferred embodiment of the present invention will be explained.

In the display device for use in a vehicle according to the first preferred embodiment, when an image of an instrument information to be seen is displayed on the display unit 5, a light thereof passes through an opening 1*b* formed on the upper surface 1*a* of the dashboard 1 and irradiated on a windshield 3 arranged above the dashboard 1, thereby a virtual image of the image for superposition is seen on the windshield 3 in front of an eye point I.

Since the windshield 3 is formed non-flat having each curvature with respect to the horizontal or vertical direction, the reflection angle of the light of the image for superposition from the display unit 5, which is irradiated on the windshield 3, is different depending upon a position on the windshield 3. Therefore, an optical path length of the light of the image for superposition, which reaches the eye point I from the display unit 5 through the windshield 3, is different depending upon a coordinate position on the display surface 5*a* of the display unit 5.

Figure 5:
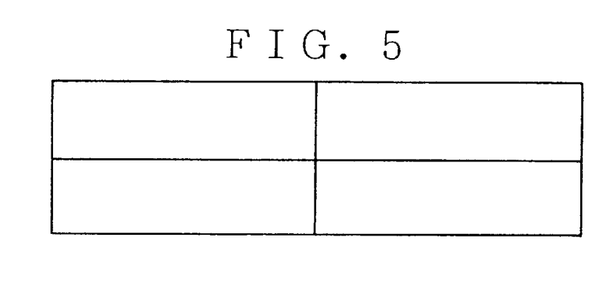
FIG. 5 illustrates an image of the information from an instrument in which the image signal is generated, to be projected on the windshield in FIG. 1.
Figure 6:
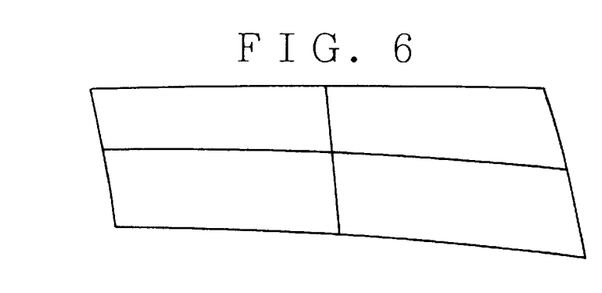
FIG. 6 illustrates a virtual image of an inverse image for superposition supposed to be seen on the windshield when the visual image shown in FIG. 5 is displayed on the display unit in FIG. 1.

Supposing that an image of the information from an instrument in which the image signal is generated in an information-generating unit (not shown in the figure) is a lattice-like image consisting of longitudinal and lateral lines as shown in FIG. 5, when one sees the windshield 3 in front from the eye point I, an inverse virtual image for superposition supposed to be seen on the windshield 3 is distorted as if the image is pulled in the lower right direction as shown in FIG. 6.

Consequently, the display device for use in a vehicle according to the first preferred embodiment is constructed so as to carry out the following operation so that the virtual image of the inverse image for superposition to be seen on the windshield 3 is not distorted when the driver sees the windshield 3 from the eye point I.

When an image signal of the image to be seen of the instrument information generated in an instrument information-generating unit (not shown in the figure) is input to the signal input terminal 9, each pixel of the image signal of the image to be seen is A/D-converted by an A/D converter 11 in turn starting from one having small coordinate value and then, the digital value of each pixel of the A/D-converted image signal is input to a conversion unit 13 in turn starting from one having small coordinate value.

Simultaneously, when the image signal of the image to be seen is input to the signal input terminal 9, a synchronizing signal is separated from the image signal in the synchronizing signal separating circuit 10 and then, the synchronizing signal is input to the conversion unit 13 as a clock signal through the signal input terminal 9.

Then, in the conversion unit 13, in response to the synchronizing signal input as the clock signal, each digital pixel value of the digital image signal of the image to be seen input from the A/D converter 11 is written on a video frame position of the external RAM 17 corresponding to the coordinate value position on the display surface 5a of the display unit 5, which is assigned by a coordination conversion table installed in the external ROM 15, in turn starting from one having small coordinate value.

Subsequently, when each digital pixel value of the digital image signal of the image to be seen input from the A/D converter 11 is written in the video frame of the external RAM 17 for one whole image plane of the image to be seen, all digital pixel values for one frame written in the video frame is read out from the external RAM 17 in turn starting from one having small coordinated vale, then D/A-converted by the D/A converter 19 and then, output as an analog image signal of the inverse image for superposition from a signal input terminal 21 to the display unit 5.

Figure 7:
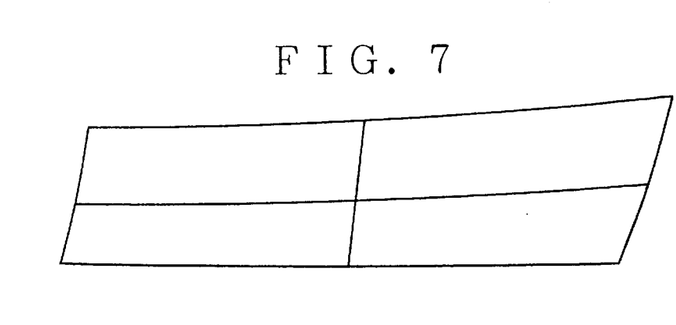
FIG. 7 illustrates an inverse image for superposition to be displayed on the display unit in FIG. 1 so that an image without distortion such as an image to be seen in FIG. 5 can be seen on the windshield as a virtual image.

As a result, an inverse image for superposition distorted in a shape as illustrated in FIG. 7, in which the imaginary virtual image of the image for superposition illustrated in FIG. 6 is reversed around the horizontal axis and the different magnification of the image due to the different curvature for each horizontal or vertical direction of the windshield 3 is taken into consideration, is displayed on the display surface 5a of the display unit 5.

When a light of the inverse image for superposition as described above is irradiated onto the windshield 3 arranged above the dashboard 1 after passing through the opening 1b formed on the upper surface 1a of the dashboard 1, that is, the inverse image for superposition is distorted in such a manner as the imaginary inverse image of image for superposition shown in FIG. 6, a distortion already existed in the inverse image for superposition displayed on the display unit 5 as illustrated in FIG. 7 is canceled out by a distortion, which is newly arisen while the light reaches the windshield 3 from the display unit 5. As a result, when the driver sees the windshield 3 from the eye point I, a virtual image of the inverse image for superposition to be seen on the windshield 3 on which the light of the inverse image for superposition is reflected becomes a lattice image consisting of original longitudinal and lateral straight lines without distortion as shown in FIG. 5.

Consequently, with the construction of the display device for use in a vehicle according to the first preferred embodiment, when the driver sees the windshield 3 from the eye point I, the virtual image of the image for superposition to be seen on the windshield 3 on which the light of the inverse image for superposition is reflected can be seen as an image without distortion in both horizontal and vertical directions similarly to the lattice-like image illustrated in FIG. 5, even if the windshield 3 has non-uniform curvature in the horizontal and vertical directions and nonuniform angle of inclination relatively to the horizontal or vertical plane depending upon a position of the windshield 3.

Therefore, when the position on the windshield 3 to be seen from the eye point I is not specified at a constant point due to the different seat position and physique of the driver or when the degree and contents of the distortion of the virtual image of the image for superposition to be seen on the windshield 3 changes due to the change in the shape of the windshield 3 depending upon a type of the vehicle, an external ROM can be easily replaced by another having different contents.

That is, in the display device for use in a vehicle according to the first preferred embodiment, in order to cancel out the distortion arisen when the light of the inverse image for superposition is reflected on the windshield 3, the inverse image for superposition displayed on the display unit 5 is in advance distorted in accordance with the contents installed in an external ROM 15, which is replaceable by another external ROM 15 having different contents.

In the display device for use in a vehicle according to the first preferred embodiment, since the lattice-like image consisting of longitudinal and lateral straight lines as shown in FIG. 5 is displayed on the display unit 5 in a distorted form as shown in FIG. 7, the longitudinal and lateral straight lines constituting the lattice are displayed inclined on the display unit 5. In order to display such a distorted image on the display unit 5 with the same resolution as that when the image is not distorted, a pitch between the adjacent pixels in the pertinent direction when inclined by 45° is needed to be the same pitch between the adjacent pixels adjoining in the longitudinal and lateral directions with each other.

In other words, supposing that a pitch between the adjacent pixels in the longitudinal and lateral directions is 1, a pitch between the adjacent pixels in the direction inclined by 45° is $2^{1/2}$. Therefore, unless the number of pixels of the display unit 5 is set $2^{1/2}$ times as that when the non-distorted image is displayed thereon, the distorted image cannot be displayed on the display unit 5 with the same resolution as that when the image is not distorted, for example, resulting in that an oblique line might be displayed as stair-shaped longitudinal and lateral lines.

If the display unit 5 having high resolution is utilized taking the above point into consideration, the number of pixels of the display unit 5 exceeds the number of pixels of the image signal of the image to be seen, resulting in that the number of pixels of the image signal of the inverse image for superposition to be displayed on the display unit 5 increases up to the same number of pixels of the display unit 5. In such a case, when the data of each pixel of the image to be seen input to the signal input terminal 9 are assigned to the data of each pixel of inverse image for superposition output from the signal output terminal 21 by using the coordinate conversion table installed in the external ROM 15, like the display device for use in a vehicle according to the first preferred embodiment, pixels having no data arise in the image signal of the inverse image for superposition.

Therefore, as a logical consequence, the interpolation of data becomes necessary with respect to each pixel of the inverse image for superposition, in which no corresponding pixel exists in the image signal of the image to be seen.

A display device for use in a vehicle according to a second preferred embodiment of the present invention, which can cope with such a situation as described above, will be explained with reference to FIGS. 8 and 9.

Figure 8:
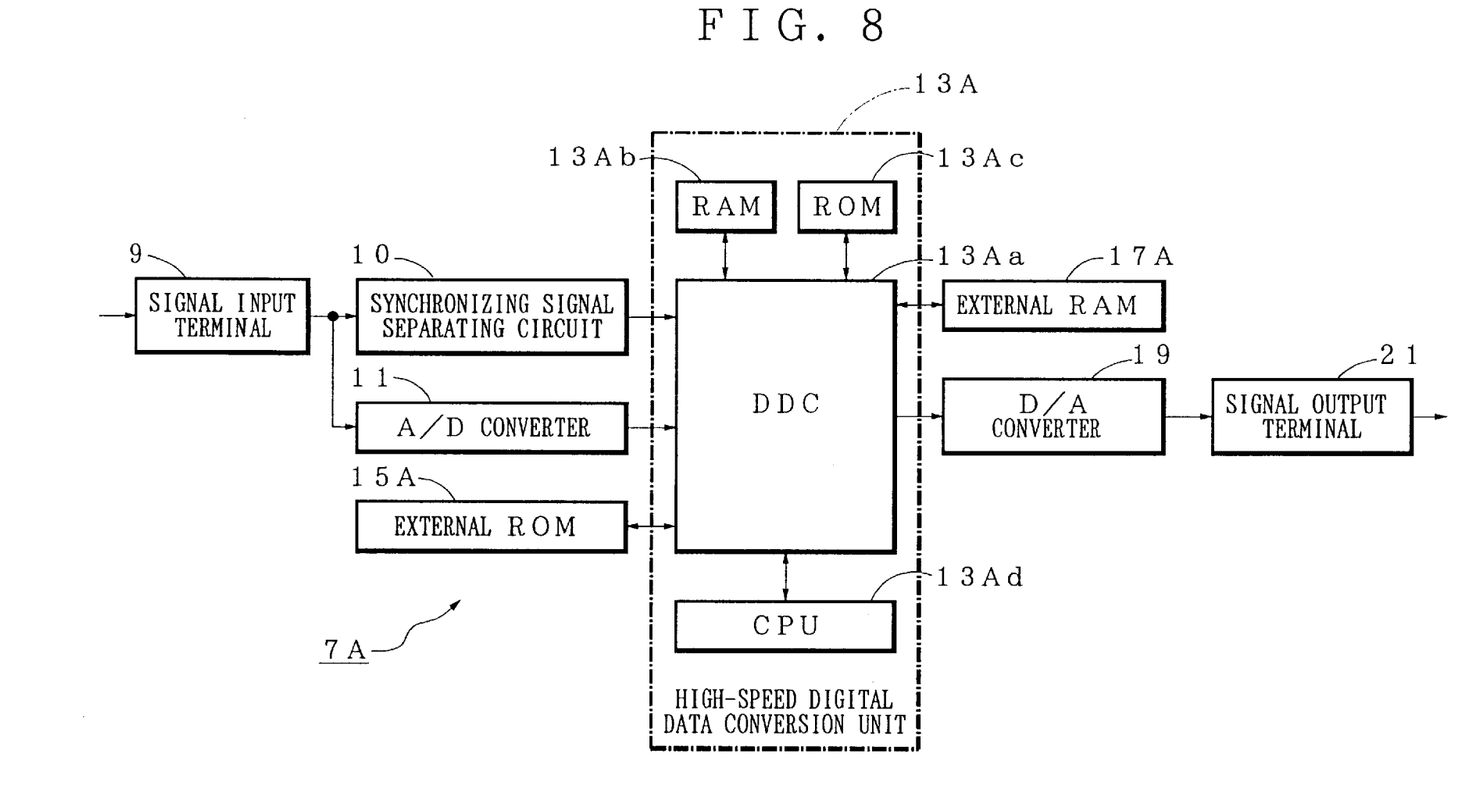
FIG. 8 is a block diagram illustrating an electrical constitution of the control unit in the display device for use in a vehicle according to a second preferred embodiment of the present invention.

FIG. 8 is a block diagram illustrating an electrical constitution of the control unit in the display device for use in a vehicle according to the second preferred embodiment of the present invention, in which contents installed in the replaceable external ROM 15A (corresponding to the holding means) of the control unit 7A and contents of the processing program installed in the ROM 13Ac in the conversion unit 13A are different from that in the external ROM 15 and that in the conversion unit 13, respectively.

Furthermore, the display device for use in a vehicle according to the second preferred embodiment is different from that according to the first preferred embodiment in a point that each pixel value of the digital image signal before being processed by the conversion unit 13 is tentatively stored in the external RAM 17A of the control unit 7A.

In the external ROM 15A of the display device for use in a vehicle according to the second preferred embodiment, a coordinate value of a pixel of the image to be seen and a coordinate value of the corresponding pixel of the inverse image for superposition are stored having a relationship therebetween with respect to pixels, each of which has a corresponding pixel in the image signal of the image to be seen input to the signal input terminal 9 out of each pixel of the inverse image for superposition output from the signal output terminal 21.

Figure 9:
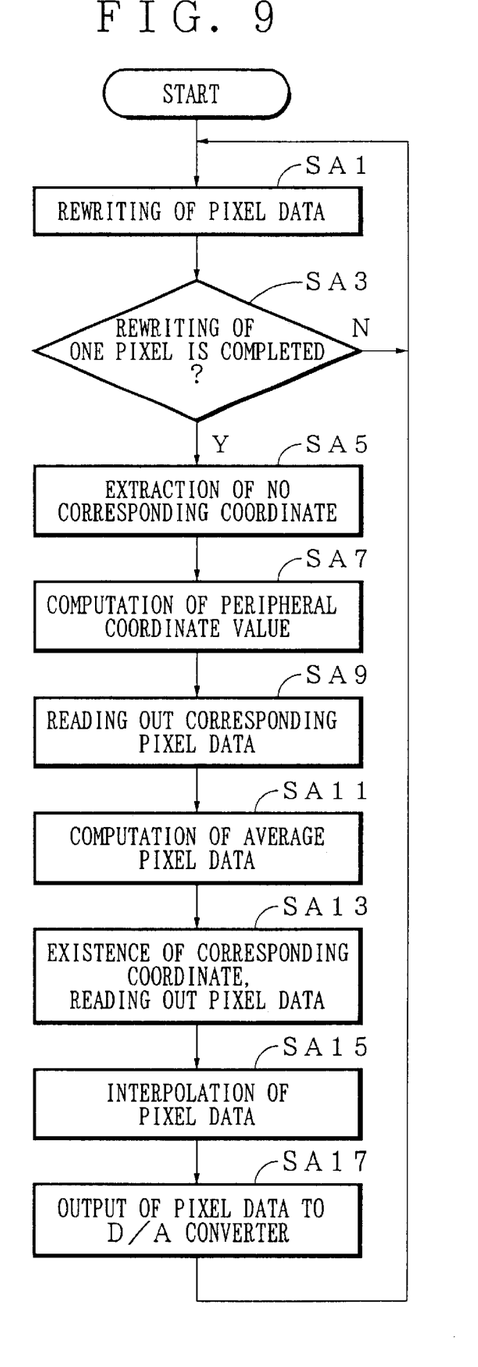
FIG. 9 is a flow chart illustrating a processing that the digital data controller in the high-speed digital data conversion unit in FIG. 8 makes the CPU carry out in accordance with a processing program stored in the ROM.

FIG. 9 is a flow chart illustrating a processing that a DDC 13A carries out in accordance with a processing program stored in the ROM 13Ac.

First, the data at each video frame position of the external ROM 13Ac is rewritten to data of a pixel of the same coordinate value as that of the digital image signal taken in from the A/D converter 11 (step SA1), then whether or not the rewriting of the video frame data of the external RAM 17A is completed is confirmed with respect to the pixel data for one image plane of the digital image signal taken in from the A/D converter 11 (step SA3).

If not completed (N at step SA3), the processing returns to step SA1, on the other hand, if completed (Y at step SA3), the coordinate value of the image signal of the image to be seen, corresponding to the coordinate value of the image signal of the inverse image for superposition, on the coordinate conversion table installed in the external ROM 15A is searched in turn starting from the image signal of inverse image for superposition having small coordinate value, thereby extracting pixels, in each of which the corresponding coordinate value of the image to be seen does not exist on the coordinate conversion table (step SA5).

Then, the corresponding coordinate values in the image signal of the image to be seen on the coordinate conversion table, in which the corresponding coordinate value of the image signal of the image to be seen does not exist on the coordinate. conversion table and which corresponds to the value of the peripheral coordinate adjoining the coordinate in the image signal of the inverse image for superposition, are all searched (step SA7) and then, data of the pixel of the corresponding thus searched value of the coordinate in the image signal of the image to be seen are read out from the corresponding video frame position of the external RAM 17A (step SA9) and then, an average of the data of pixel is computed (step SA11).

Subsequently, the data of pixel corresponding to the coordinate value in the image signal of the inverse image for superposition, the corresponding coordinate value of which in the image signal of the image to be seen exists on the coordinate conversion table of the external ROM 15A, are read out from the corresponding video frame position of the external RAM 17A, except those extracted at step SA5, by using the synchronizing signal of the image signal of the image to be seen input to the signal input terminal 9 as a sampling clock (step SA13).

Simultaneously, the data of pixel corresponding to the coordinate value in the image signal of the inverse image for superposition, the corresponding coordinate value of which in the image signal of the image to be seen does not exist on the coordinate conversion table of the external ROM 15A, are interpolated with the average of the data of pixel computed at step SA11 (step SA15).

Then, the data of pixel of the inverse image for superposition for one image plane after the interpolation are output to the D/A converter 19 in turn starting from the data having small coordinate value in the image signal of the inverse image for superposition (step SA17) and then, the processing returns to step SA1.

In the second preferred embodiment, a series of the processing carried out by the conversion unit 13A according to the flow chart shown in FIG. 9 is a processing corresponding to the signal generating means described in the claim. The conversion unit 13A and the external ROM 15A constitute the image distortion generating means described in the claim.

In the display device for use in a vehicle according to the second preferred embodiment, the image signal of the image to be seen including the instrument information, which is generated in the instrument information generating unit (not shown in the figure) and input to the signal input terminal 9, is A/D-converted by the A/D converter 11 and then, the digital value of each pixel of the A/D-converted image signal is written on a video frame position of the corresponding external RAM 17 in turn starting from one having small coordinate value.

Subsequently, the data of pixel of the coordinate value in the image signal of the inverse image for superposition, the corresponding coordinate value of which in the image signal of the image to be seen exists on the coordinate conversion table installed in the external ROM 15A, are read out from the corresponding video frame position of the external RAM 17A by the conversion unit 13A, by using the synchronizing signal separated in the synchronizing signal separating circuit 10 out of the image signals of the image to be seen input to the signal input terminal 9 as a sampling clock.

Simultaneously, the data of pixel of the other coordinate value in the image signal of inverse image for superposition are computed by averaging the data of pixel of the peripheral coordinate value and interpolated in the data of pixel read out from the corresponding video frame position of the external RAM 17A. The digital pixel value for one image plate after the interpolation is read out in turn starting from one having small coordinate value in the image signal of the inverse image for superposition, then is D/A converted by the D/A converter 19 and then, is output from the signal output terminal 21 to the display unit 5 as an analog image signal of the inverse image for superposition.

With the display device for use in a vehicle according to the second preferred embodiment, the distortion of the virtual image of the image for superposition on the windshield 3 can be suitably canceled out by replacing the external ROM 15A with another having different contents.

In order to display the inverse image for superposition on the display unit 5 with the same resolution as that of the image to be seen when the image to be seen including the instrument information is intentionally distorted to be the inverse image for superposition, the number of pixels of the display unit 5 is increased, resulting in that the pixels arise in the image signal of the inverse image for superposition, in which no corresponding pixel exists in the image signal of the image to be seen. However, with the construction of the display device for use in a vehicle according to the second preferred embodiment, the data of pixel of the image signal of inverse image for superposition, the corresponding pixel of which does not exist in the image signal of the image to be seen, are interpolated, thereby the inverse image for superposition can be displayed on the display unit 5 in an excellent condition.

In the first and second preferred embodiments, the problem of the distortion of the virtual image of the image for superposition, arising from the different seat position and physique depending upon the driver or the different shape of the windshield 3 depending upon the type of the vehicle, is solved by replacing the external ROM 15 or 15A with another having different contents.

Therefore, regarding the display device for use in a vehicle according to the first and second preferred embodiments, the replaceable external ROM 15 or 15A also serves as the distortion pattern adjusting means described in the claim.

Figure 10:
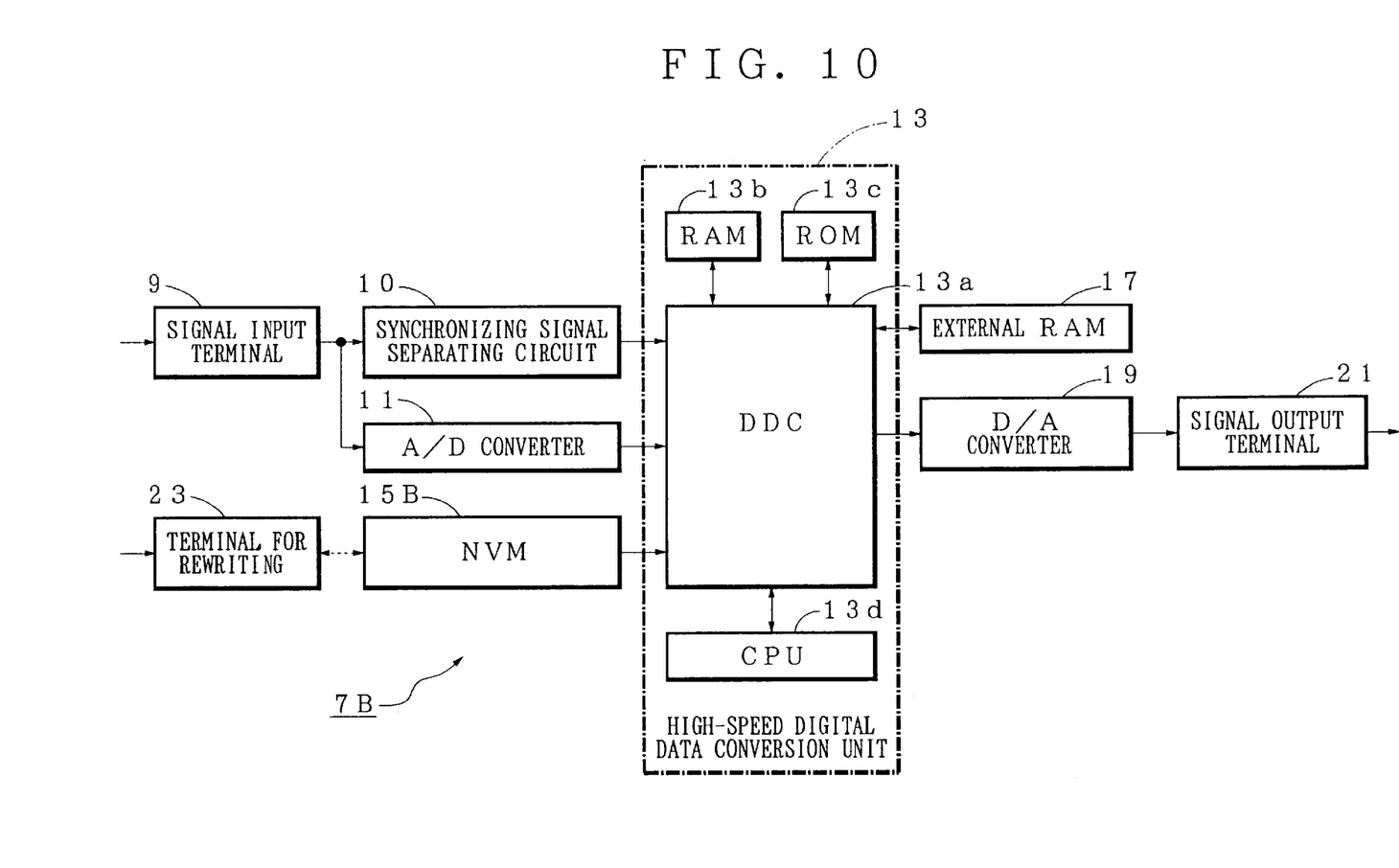
FIG. 10 is a block diagram illustrating an electrical constitution of the control unit in the display device for use in a vehicle according to a third preferred embodiment of the present invention.

FIG. 10 is a block diagram illustrating an electrical constitution of the control unit 7B in the display device for use in a vehicle according to a third preferred embodiment of the present invention, in which a non-replaceable but rewritable nonvolatile memory (hereinafter, NVM; corresponding to the holding means) 15B is utilized instead of the replaceable external ROM 15. The construction of the display device for use in a vehicle according to the third preferred embodiment corresponds to that of the display device for use in a vehicle according to the first preferred embodiment.

Figure 11:
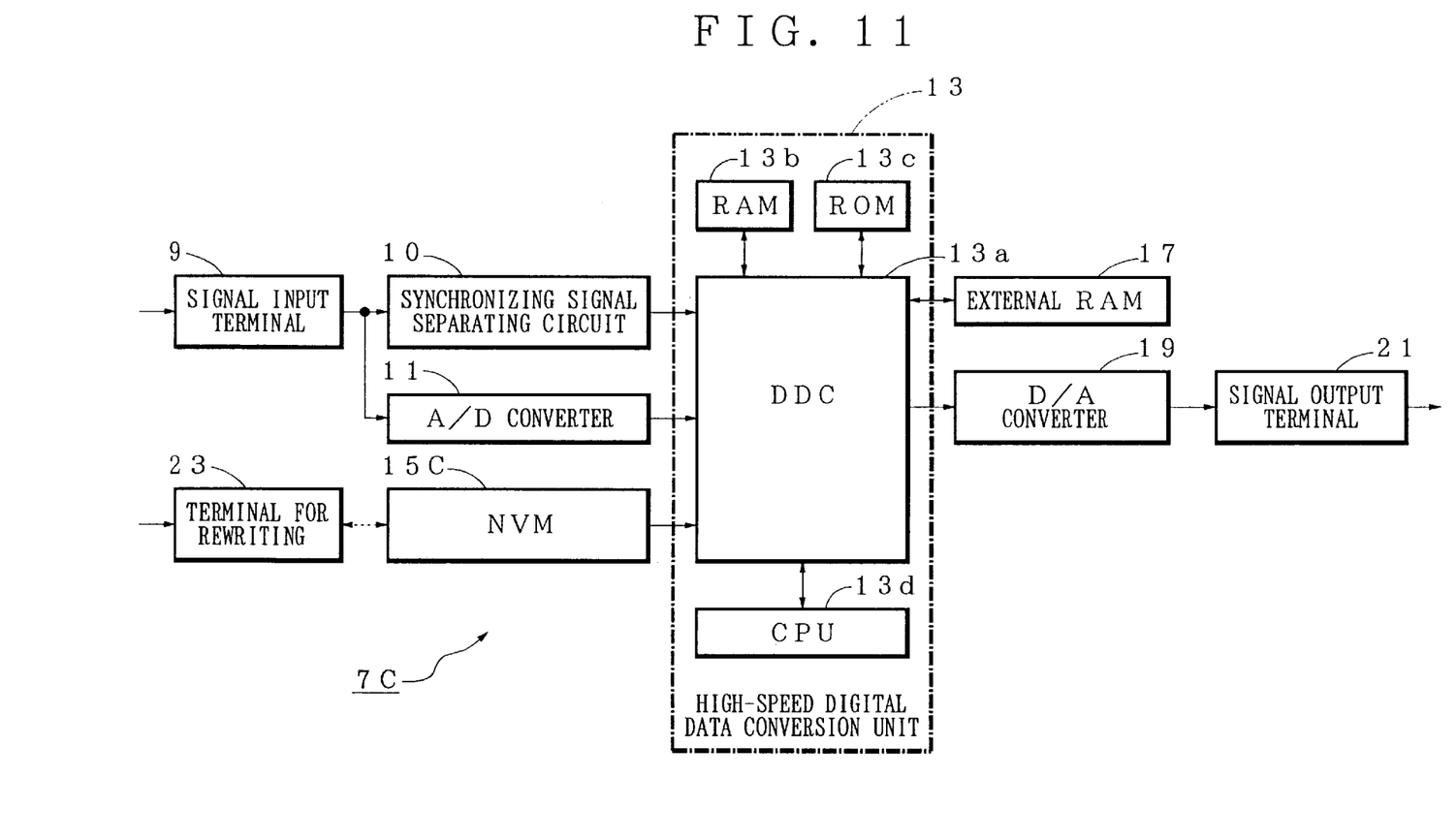
FIG. 11 is a block diagram illustrating an electrical constitution of the control unit in the display device for use in a vehicle according to a fourth preferred embodiment of the present invention.

FIG. 11 is a block diagram illustrating an electrical constitution of the control unit 7C in the display device for use in a vehicle according to a fourth preferred embodiment of the present invention, in which a non-replaceable but rewritable NVM 15C (corresponding to the holding means) is utilized instead of the replaceable external ROM 15A. The construction of the display device for use in a vehicle according to the fourth preferred embodiment corresponds to that of the display device for use in a vehicle according to the second preferred embodiment.

In the third and fourth preferred embodiments, the problem of the distortion of the virtual image of the image for superposition, arising from the different seat position and physique depending upon the driver or the different shape of the windshield 3 depending upon the type of the vehicle, is solved by rewriting the coordinate conversion table installed in the NVM 15B or NVM 15C to another having different contents, directly or by way of the conversion unit 13 or 13A, by using a terminal 23 for rewriting (corresponding to the distortion pattern adjusting means) connected from the outside of the control unit 7 or 7A.

While the terminal 23 for rewriting is connected to the NVM 15B or 15C, the inverse image for superposition (corresponding to the distorted lattice image for adjustment) shown in FIG. 7 is displayed on the display surface 5a of the display unit 5 and the virtual image of the inverse image for superposition to be seen on the windshield 3 is adjusted by cursor operation and so on at the terminal 23 for rewriting so that the virtual image becomes the lattice-like image consisting of longitudinal and lateral straight lines as shown in FIG. 5.

When the virtual image of the inverse image for superposition to be seen on the windshield 3 becomes the lattice-like image consisting of longitudinal and lateral straight lines as shown in FIG. 5, the contents of the coordinate conversion table, by which the image signal of the inverse image for superposition displayed on the display surface 5a of the display unit 5 is generated from the image signal of the image to be seen including the instrument information that is generated in the instrument information generating unit (not shown in the figure), can be searched by either the conversion unit 13, 13A or the terminal 23 for rewriting. Then, the contents installed in the NVM 15B or 15C can be replaced with the contents of the coordinate conversion table thus obtained by the search.

That is, in the third and fourth preferred embodiments, the conversion unit 13 and the NVM 15B, or the conversion unit 13A and the NVM 15C constitute the image distortion generating means described in the claim.

In each preferred embodiment described above, the light of the image displayed on the display unit 5 is guided to the eye point I after one reflection on the windshield 3, therefore an inverse image is displayed on the display unit 5. Similarly, if the light of the image is reflected for the odd number of times, the inverse image is displayed on the display unit 5.

To the contrary, if the light of the image is reflected for the even number of times, an erect image is displayed on the display unit 5.

In each preferred embodiment described above, the display unit 5 is received in the interior of the dashboard 1. Instead, the display unit 5 may be disposed outside the dashboard 1.

The aforementioned preferred embodiments are described to aid in understanding the present invention and variations may be made by one skilled in the art without departing from the spirit and scope of the present invention.

What is claimed is:

1. A display device for use in a vehicle, by which an image for superposition displayed on a display source is projected on a windshield of the vehicle so that the foreground of the vehicle visible from an eye point of the vehicle through the windshield and a virtual image of the image for superposition projected on the windshield, which is superposed upon the foreground, are seen together, comprising:

image distortion generating means for distorting the image for superposition in advance and displaying the distorted image for superposition on the display source so that distortion arisen in the virtual image of the image for superposition to be seen from the eye point due to non-flatness of the windshield is canceled out; and distortion pattern adjusting means for adjusting the amount of the distortion of the image for superposition displayed on the display source generated by the image distortion generating means with respect to upper and lower directions and right and left directions of the vehicle in the virtual image of the image for superposition, wherein the distortion pattern adjusting means adjusts a distortion pattern of the image for superposition displayed on the display source generated by the image distortion generating means to a distortion pattern in response to the non-flatness of the windshield and a positional relationship between the windshield and the eye point.

2. The display device for use in a vehicle according to claim 1, wherein the image distortion generating means displays a distorted lattice image for adjustment, in which a lattice image consisting of straight lines is distorted, on the display source as the image for superposition when the distortion pattern adjusting means adjusts a distortion pattern of the image for superposition displayed on the display source generated by the image distortion generating means.

3. The display device for use in a vehicle according to claim 1 or 2, wherein the image distortion generating means comprises:

holding means for holding a coordinate conversion table indicating a correspondence between each pixel of an image signal of the image for superposition and each pixel of an image signal of the distorted image for superposition, in which the image for superposition being distorted in advance and displayed on the display source; and signal generating means for generating an image signal of the distorted image for superposition, by assigning data for each pixel of an image signal of the image for superposition as data for corresponding each pixel in the image signal of the distorted image for superposition, on the basis of the coordinate conversion table, wherein the distortion pattern adjusting means adjusts a distortion pattern of the image for superposition displayed on the display source generated by the image distortion generating means at least in response to a change in contents of the coordinate conversion table.

4. The display device for use in a vehicle according to claim 3, wherein the holding means consists of a replaceable storage medium, which constitutes the distortion pattern adjusting means.

* * * * *